United States Patent
Pilard

(10) Patent No.: US 9,201,294 B2
(45) Date of Patent: Dec. 1, 2015

(54) LASER MODULE AND SCANNER PROJECTOR

(71) Applicant: Gael Pilard, Wankheim (DE)

(72) Inventor: Gael Pilard, Wankheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 180 days.

(21) Appl. No.: 14/097,969

(22) Filed: Dec. 5, 2013

(65) Prior Publication Data

US 2014/0152961 A1    Jun. 5, 2014

(30) Foreign Application Priority Data

Dec. 5, 2012  (DE) .......................... 10 2012 222 283

(51) Int. Cl.

| | | |
|---|---|---|
| *G03B 33/12* | (2006.01) | |
| *G02B 27/28* | (2006.01) | |
| *G03B 21/20* | (2006.01) | |
| *G02B 27/42* | (2006.01) | |
| *H04N 1/028* | (2006.01) | |
| *H04N 9/31* | (2006.01) | |
| *G02B 27/48* | (2006.01) | |

(52) U.S. Cl.
CPC ............ *G03B 21/2073* (2013.01); *G02B 27/28* (2013.01); *G02B 27/283* (2013.01); *G02B 27/4261* (2013.01); *G02B 27/48* (2013.01); *G03B 21/2033* (2013.01); *G03B 21/2066* (2013.01); *G03B 33/12* (2013.01); *H04N 1/0282* (2013.01); *H04N 9/3129* (2013.01); *H04N 9/3161* (2013.01); *H04N 9/3167* (2013.01)

(58) Field of Classification Search
CPC ..... H04N 9/3167; H04N 9/3129; H04N 9/31; H04N 1/0282; H04N 9/3161; H04N 13/0434; G02B 27/48; G02B 27/283; G02B 27/28; G02B 27/4261; G03B 21/2033; G03B 33/12; G03B 21/2066; G03B 21/2073; G03B 21/20
See application file for complete search history.

(56) References Cited

U.S. PATENT DOCUMENTS

| | | | | |
|---|---|---|---|---|
| 8,282,217 B2* | 10/2012 | Mochizuki | ...................... | 353/34 |
| 2007/0273794 A1* | 11/2007 | Sprague et al. | ............... | 348/744 |
| 2010/0265553 A1* | 10/2010 | Leopold et al. | .................. | 359/10 |
| 2012/0262675 A1* | 10/2012 | Kabuki et al. | .................... | 353/20 |
| 2013/0070205 A1* | 3/2013 | Pan et al. | ......................... | 353/31 |
| 2013/0286357 A1* | 10/2013 | Kodama et al. | ................... | 353/20 |
| 2013/0300948 A1* | 11/2013 | Jannard et al. | ................ | 348/756 |

* cited by examiner

*Primary Examiner* — Sultan Chowdhury
*Assistant Examiner* — Magda Cruz
(74) *Attorney, Agent, or Firm* — Kenyon & Kenyon LLP

(57) ABSTRACT

A laser module includes a first laser light source, a second laser light source, and a third laser light source. Laser beams of the laser light sources are combinable into an overall laser beam. The laser beam of the first laser light source and the laser beam of the second laser light source have a first polarization, and the laser beam of the third laser light source has a second polarization. The laser beams of the first and the third laser light sources are coupled into the overall laser beam with the aid of mirror devices. The laser beam of the second laser light source is split, the polarization of the laser beam of the second laser light source being changed from the first polarization to the second polarization in a splitting path. The laser beam of the second laser light source having the second polarization is coupled into the overall laser beam via the splitting path, and the laser beam of the second laser light source having the first polarization is coupled into the overall laser beam via a main path.

12 Claims, 4 Drawing Sheets

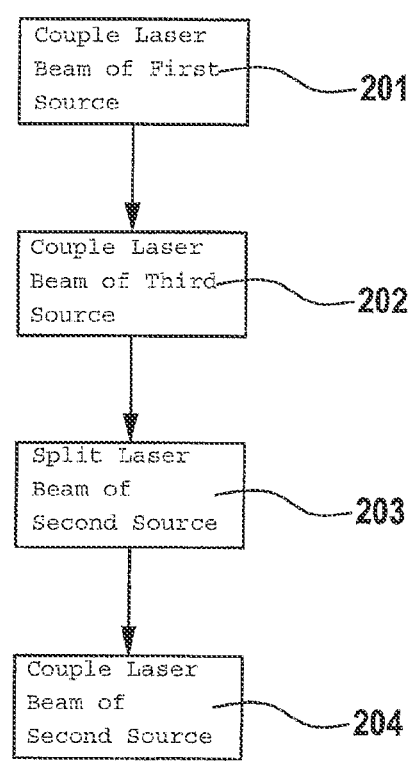

LASER MODULE AND SCANNER PROJECTOR

FIELD OF THE INVENTION

The present invention relates to a laser module and a scanner projector. Moreover, the present invention relates to a method for generating an overall laser beam from multiple laser beams from different laser light sources.

BACKGROUND INFORMATION

Laser projectors without a projection optical system having a micromirror unit which scans a projection surface (scanning mirror laser projectors) are known. In the near future, the mentioned micromirror units will play an important role in projection devices, in particular miniaturized projectors. Of the various technologies used for providing a pico projector, laser scanning devices offer several advantages, such as a small design and an increased efficiency due to the fact that the laser light is emitted only when it is actually needed. The generated images are advantageously very bright due to the bright colors that come from laser sources. A known disadvantage of the mentioned laser light sources is the so-called "speckle effect," which is caused by interferences between the laser beam and a projection surface and which results in a plurality of light spots having different brightness levels.

An improvement in the form of reducing the mentioned speckle effect lies in using laser diodes instead of solid-state lasers.

To even further reduce the speckle effect, a high modulation rate of the laser light of the laser diode in the range of several 100 MHz may be used to keep a speckle contrast ratio for an observer within an acceptable level. However, as the result of using this type of modulation, the base spectral line width is too narrow to achieve an acceptably low contrast ratio for the speckle effect. Higher modulation rates in the range of 1 GHz are not easily integratable into a consumer article having a device, for example projectors, or a mobile telephone, a camera, or a laptop.

Therefore, there is a need for efficient reduction of the speckle effect.

SUMMARY

According to a first aspect, a laser module is provided by the present invention which has the following:
   a first laser light source;
   a second laser light source; and
   a third laser light source,
laser beams of the laser light sources being combinable into an overall laser beam, the laser beam of the first laser light source and the laser beam of the second laser light source having a first polarization, and the laser beam of the third laser light source having a second polarization, the laser beams of the first and the third laser light sources being coupled into the overall laser beam with the aid of mirror devices, the laser beam of the second laser light source being split, the polarization of the laser beam of the second laser light source being changed from the first polarization to the second polarization in a splitting path, the laser beam of the second laser light source having the second polarization being coupled into the overall laser beam via the splitting path, and the laser beam of the second laser light source having the first polarization being coupled into the overall laser beam via a main path.

According to a second aspect, a method for generating an overall laser beam from multiple laser beams is provided by the present invention, a laser beam being emitted in each case from a first, second, and third laser light source, having the following steps:
   coupling a laser beam of the first laser light source having a first polarization into the overall laser beam;
   coupling a laser beam of the third laser light source having a second polarization into the overall laser beam;
   splitting a laser beam of the second laser light source having a first polarization into a main path and a splitting path, in the splitting path the polarization of the laser beam of the second laser light source being changed from the first polarization to the second polarization; and
   coupling the laser beam of the second laser light source into the overall laser beam via the main path and via the splitting path.

One preferred specific embodiment of the laser module according to the present invention provides that the laser beam of the first laser light source is reflected by essentially 90 degrees with the aid of a 50/50 beam splitter which has a surface, facing the first laser light source, having a wavelength-dependent coating which is totally reflective for the first laser light source, the reflected laser beam of the first laser light source being coupled into the overall laser beam, the laser beam of the second laser light source being split into the main path and the splitting path with the aid of the 50/50 beam splitter. Advantageously, full utilization may be made of the light output of the first laser light source, and the laser beam of the second laser light source may be split, with the aid of the 50/50 beam splitter.

Another preferred specific embodiment of the laser module according to the present invention is characterized in that the change in the polarization of the second laser beam of the second laser light source is carried out using a lambda/2 plate, an orientation of the lambda/2 plate relative to the polarization direction of the laser beam of the second laser light source being approximately 45 degrees. A change in the polarization of the laser beam of the second laser light source is thus advantageously carried out with the aid of a proven separate, specifically oriented lambda/2 plate.

Another preferred specific embodiment of the laser module according to the present invention provides that the laser beam of the first laser light source is deflected by essentially 90 degrees with the aid of a wavelength-dependent coating of a first polarization-dependent beam splitter and is coupled into the overall laser beam, a polarization of the laser beam of the second laser light source being changed from the first to the second polarization with the aid of the first polarization-dependent beam splitter, and the laser beam of the second laser light source being split into the main path and the splitting path, a portion of the laser beam having the first polarization of the second laser light source being coupled into the main path, and a portion of the laser beam having the second polarization of the second laser light source being coupled into the splitting path. This results in a savings of various elements, since two polarization-dependent beam splitters may be used for the laser module.

Another preferred specific embodiment of the laser module according to the present invention is characterized in that the laser beam of the second laser light source has a first polarization having an orientation of essentially 45 degrees with respect to the first polarization-dependent beam splitter. A splitting effect of the polarization-dependent beam splitter may thus be advantageously achieved by a specific polarization of the first laser light source.

Another preferred specific embodiment of the laser module according to the present invention is characterized in that the laser beam of the third laser light source is coupled into the splitting path of the laser beam of the second laser light source with the aid of a second mirror device which has a surface, facing the third laser light source, having a coating which is transparent to the laser beam of the third laser light source, the laser beam of the second laser light source having the second polarization being reflected by essentially 90 degrees with the aid of the second mirror device. The splitting path for the second laser light source is thus advantageously provided with an element which may also be used for coupling the laser light of the third laser light source.

Another preferred specific embodiment of the laser module according to the present invention is characterized in that tolerances of at least one element from the following group:
  50/50 beam splitter,
  first polarization-dependent beam splitter,
  first mirror device,
  lambda/2 plate,
  second mirror device,
  second polarization-dependent beam splitter,
are dimensioned in such a way that an angle between the combined laser beams of the three laser light sources is minimal. A separation angle between the converged beams of the laser light sources to form an overall beam may thus be kept as small as possible by dimensioning of tolerances of individual elements.

Another preferred specific embodiment of the laser module according to the present invention provides that two mirror devices are situated in the splitting path, at least one of the mirror devices being mechanically adjustable. In this way the laser beam of the second laser light source may be converged very well, so that the two split portions of the laser beam of the second laser light source are essentially completely recombined. For this purpose, it is advantageous that only a single second laser light source is necessary, the adjustment being carried out solely by a mechanical arangement.

Another preferred specific embodiment of the laser module according to the present invention provides that the first laser light source is a blue laser diode, the second laser light source is a red laser diode, and the third laser light source is a green laser diode. A particularly efficient reduction of the speckle effect may be achieved with this association of laser light sources with laser colors, i.e., laser diodes, since the reduction of the mentioned effect is most effective with red laser light.

Another preferred specific embodiment of the laser module according to the present invention provides that the first polarization is a linear polarization and the second polarization is a vertical polarization. A specific association of polarization with the laser light source is advantageously provided, it also being advantageously conceivable to transpose the mentioned association.

One particular advantage of the present invention is that, with the aid of only a single different laser light source in each case, it is possible to generate an overall image on a projection surface with reduced speckle. This is achieved by splitting a beam path of one of the laser light sources, the polarization direction of the mentioned laser beam within the splitting path being changed. As the result of combining the laser beam from one of the laser light sources which is altered in this way with the unaltered laser light beams of all laser light sources, an image with reduced speckle is provided with the aid of the laser module according to the present invention.

Further features and advantages of the present invention are explained below based on specific embodiments, with reference to the figures. All described or illustrated features, alone or in any arbitrary combination, constitute the subject matter of the present invention, regardless of their wording or illustration in the description or in the figures, respectively.

The figures are primarily intended to elucidate the principles essential to the present invention. Identical or functionally equivalent elements are denoted by the same reference numerals in the figures.

BRIEF DESCRIPTION OF THE DRAWINGS

FIG. 4 shows a schematic illustration of a flow chart of one specific embodiment of a method according to the present invention.

DETAILED DESCRIPTION

It is already known that a change in a polarization direction of a laser beam may reduce the speckle effect. If a linearly polarized laser beam which is rotated by 90°, for example, is superimposed on the unaltered laser beam, this results in a reduction of the speckle contrast ratio by a factor of $\sqrt{2}$, i.e., approximately 1.41.

The laser beam combining device described below makes use of this effect to reduce the speckle contrast ratio of the laser light of the red laser diode.

Figure 1:
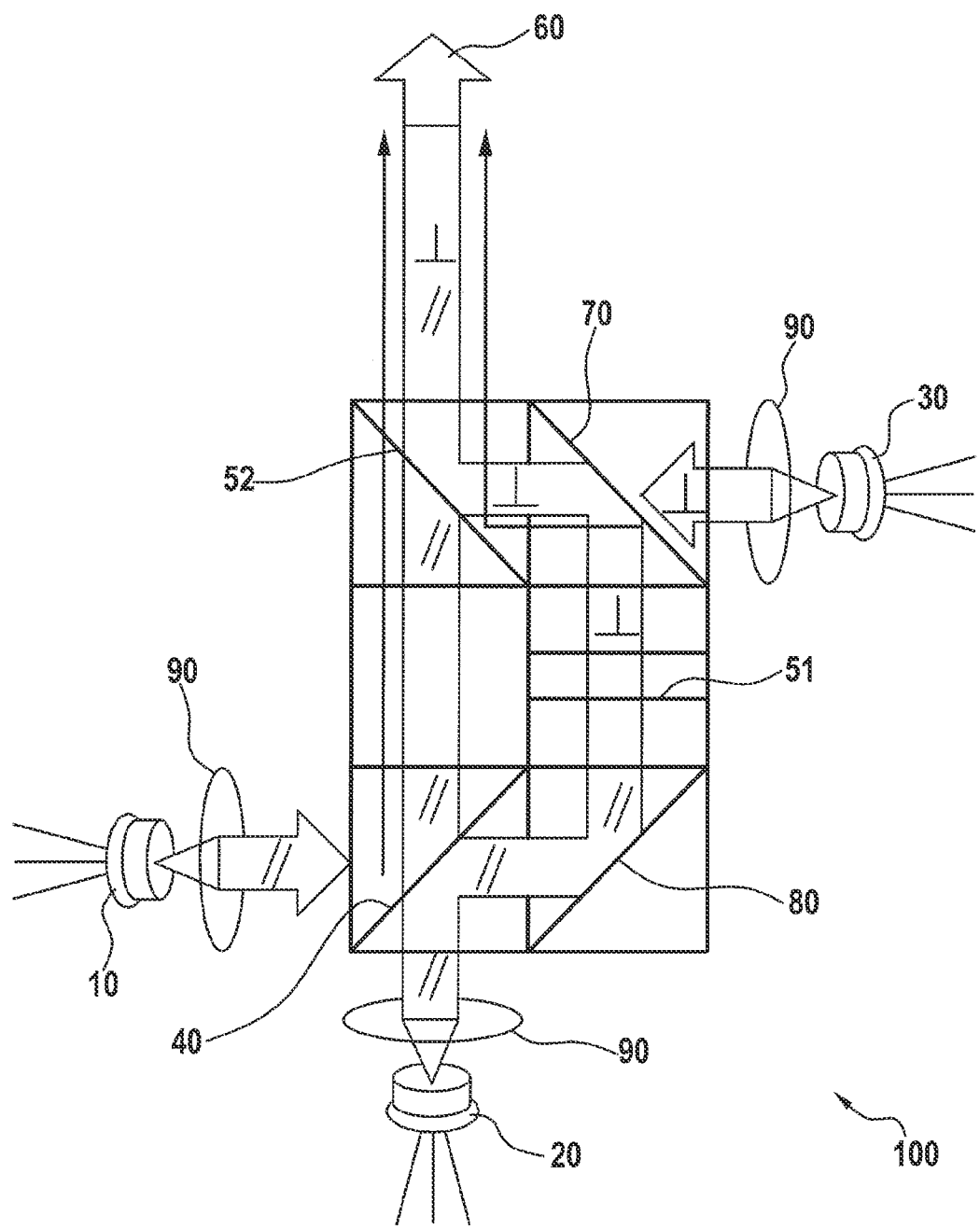
FIG. 1 shows a schematic configuration of one specific embodiment of a laser module according to the present invention.

FIG. 1 shows a schematic overall configuration of one specific embodiment of the device according to the present invention.

A laser module 100 according to the present invention has a first laser light source 10, a second laser light source 20, and a third laser light source 30. First laser light source 10 is preferably a blue laser diode, second laser light source 20 is preferably a red laser diode, and third laser light source 30 is preferably a green laser diode. The laser beams of the mentioned laser light sources 10, 20, 30 are collimated, i.e., aligned in parallel, with the aid of collimators 90 in the form of optical lenses, for example, prior to entry into laser module 100.

The laser beam of first laser light source 10 is reflected by essentially 90° on a 50/50 beam splitter 40, the direction of reflection essentially corresponding to an orientation of overall laser beam 60. For this purpose, 50/50 beam splitter 40 has an appropriate coating.

A laser beam of second laser light source 20 in the form of red laser light likewise reaches mentioned 50/50 beam splitter 40. The laser beam of red laser light source 20, the same as the laser light of first laser light source 10, is polarized in parallel, the light beam of second laser light source 20 being split at 50/50 beam splitter 40. A portion of the mentioned beam is thus directly coupled into overall laser beam 60, and another portion is reflected on 50/50 beam splitter 40 by essentially 90 degrees and reaches a second mirror device 80, on which the laser beam of second laser light source 20 is once again reflected by essentially 90 degrees. Thus, the laser light of second laser light source 20, in addition to a main path, also reaches a splitting path, and is altered therein with the aid of a lambda/2 plate 51 by changing the polarization from parallel to vertical. For this purpose, it is provided that the polarization axis of lambda/2 plate 51 is rotated by essentially 45 degrees with respect to the polarization of the laser beam of second laser light source 20.

The laser light beam having the changed polarization direction is once again reflected by essentially 90 degrees in the splitting path with the aid of a first mirror device 70 which preferably is designed as a dichroic or dielectric mirror, and with the aid of a second polarization-dependent beam splitter 52 is reflected once again by essentially 90 degrees in order to be coupled, with the vertical polarization, into overall laser beam 60. As a result, a path difference and a recombination of red laser light via two paths are achieved, linearly polarized red laser light being guided in a main path, and vertically polarized red laser light being guided in a splitting path. This may result in a significant reduction of the speckle effect, so that essentially punctiform spots of the laser beams are generated on a projection surface (not illustrated). Laser light of third laser light source 30 is preferably designed as a green laser beam having vertical polarization, and is deflected on first mirror device 70, which due to its dichroic property is essentially transparent to laser light of this type. The laser beam of third laser light source 30 is reflected by essentially 90 degrees with the aid of second polarization-dependent beam splitter 52, and is thus coupled into overall laser beam 60.

As a result, overall laser beam 60 is formed from a blue laser beam and a green laser beam having unchanged polarizations (linear or vertical), and from a red laser beam having two different polarizations (linear and vertical).

Figure 2:
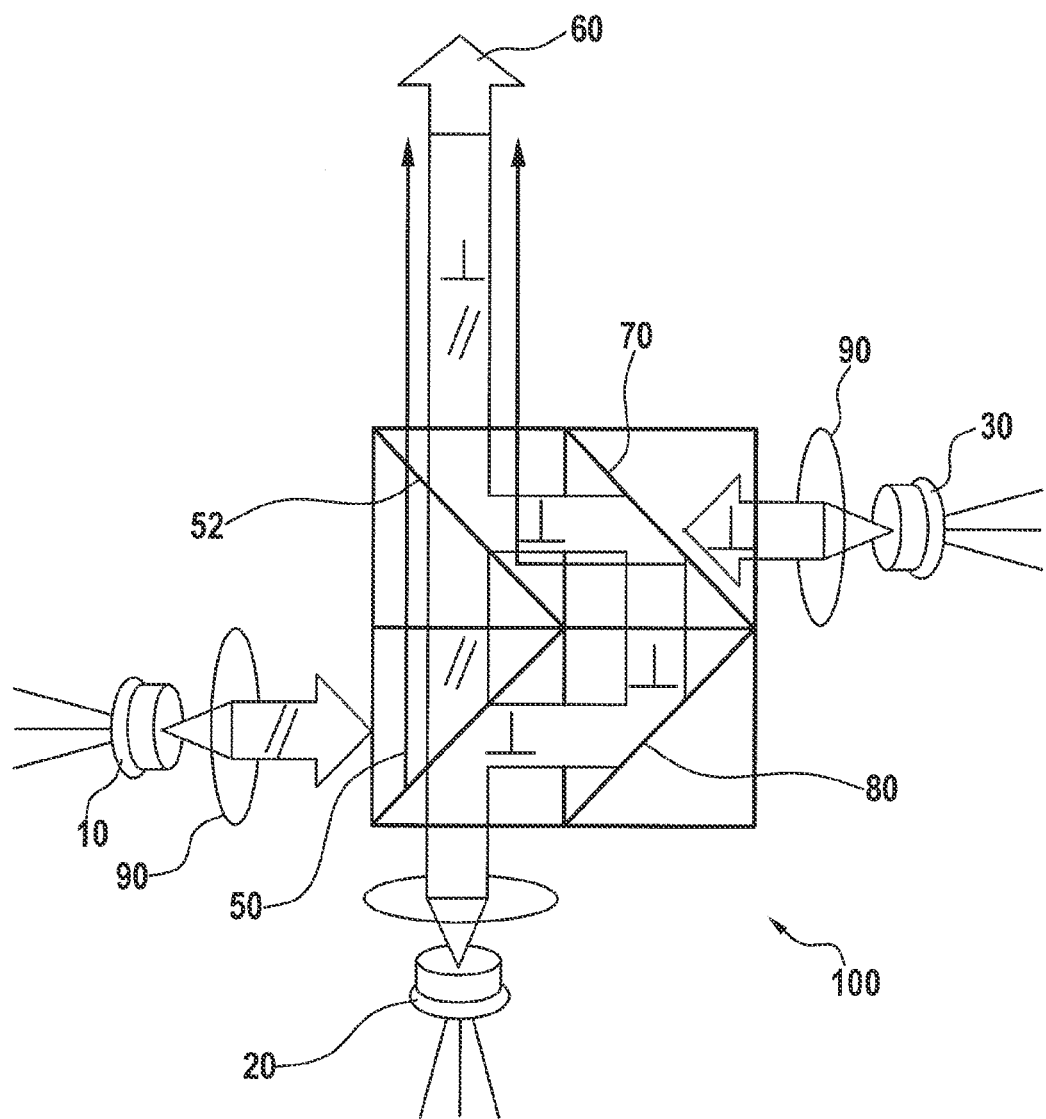
FIG. 2 shows a schematic configuration of another specific embodiment of a laser module according to the present invention.

A second specific embodiment of laser module 100 according to the present invention is schematically illustrated in FIG. 2.

A difference from the specific embodiment in FIG. 1 is that the laser beam of first laser light source 10 is now deflected by essentially 90 degrees, i.e., completely reflected, with the aid of a color-dependent, first polarization-dependent beam splitter 50. For this purpose, first polarization-dependent beam splitter 50 has a coating, on a surface facing first laser light source 10, which causes a total reflection for the laser beam of first laser light source 10.

For the laser beam of second laser light source 20, first polarization-dependent beam splitter 50 also functions as a 50/50 beam splitter which additionally causes a change in the polarization of the laser light of second laser light source 20. This requires that second laser light source 20 is linearly polarized and very precisely oriented at 45 degrees relative to first polarization-dependent beam splitter 50. Thus, in contrast to the specific embodiment of laser module 100 in FIG. 1, a lambda/2 plate 51 is advantageously not necessary for changing the polarization of the laser beam of second laser light source 20.

As a result, the specific embodiment of laser module 100 according to the present invention in FIG. 2 may advantageously be implemented with even fewer elements. In other respects, schematic beam progressions of the laser beams of laser light sources 10, 20, 30 correspond to those of the specific embodiment in FIG. 1.

All types of polarization are indicated by symbols in FIGS. 1 and 2, thus making a distinction possible as to whether the laser light is linearly or vertically polarized.

Figure 3:
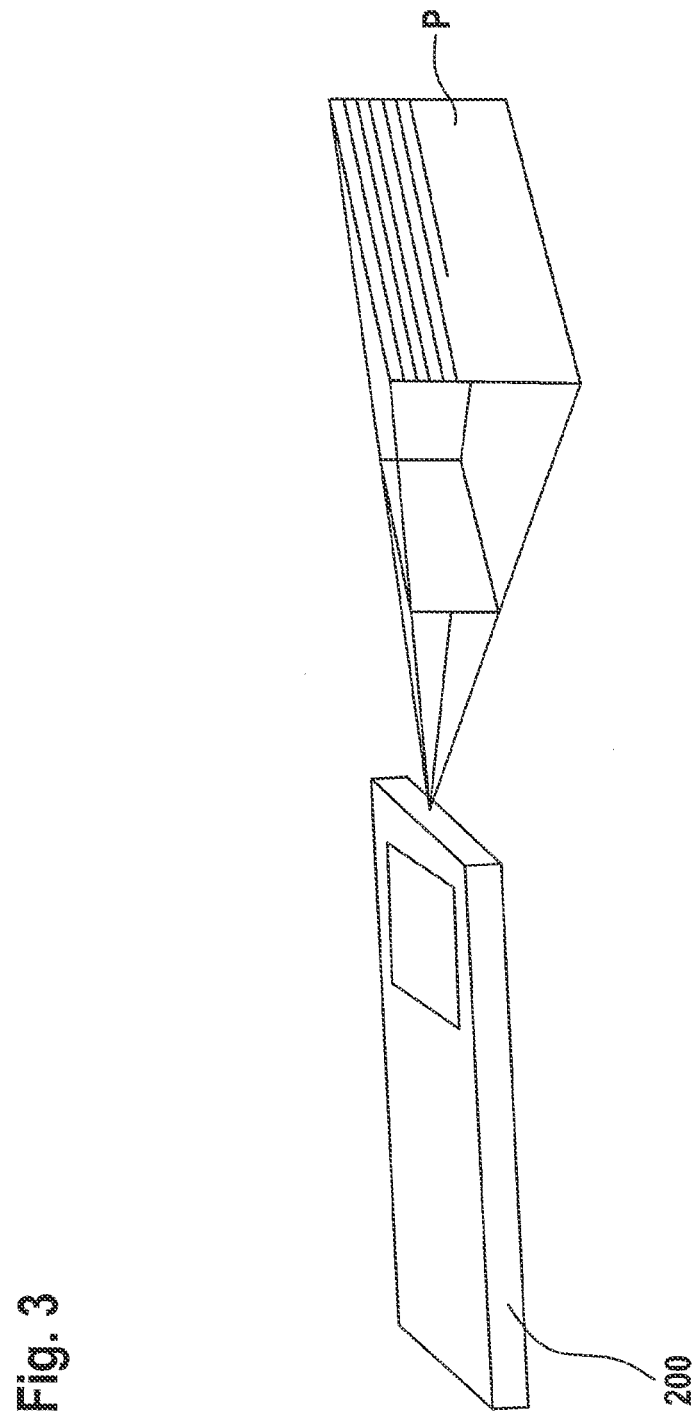
FIG. 3 shows a schematic illustration of a scanner projector having the laser module according to the present invention.

FIG. 3 shows a schematic view of a scanning laser projector or scanner projector 200 in which laser module 100 according to the present invention may be used. With the aid of laser module 100, scanner projector 200, which may be situated within a mobile device (for example, a mobile telephone, laptop, etc.), emits multiple laser beams, combined according to the present invention, in the form of an overall laser beam onto a projection surface P, and thus forms an overall image which is composed of lines with laser light dots.

Due to the fact that only a single laser light source is present for each laser beam, it is therefore necessary to carry out the combination or overlapping of the individual laser beams with great precision. For this reason, it may preferably optionally be provided that at least one mechanical adjustment capability of the deflection devices of laser module 100 is provided. This means that in the specific embodiments of laser module 100 in FIGS. 1 and 2, at least one of mirror devices 70, 80 and/or 50/50 beam splitter 40 and/or polarization-dependent beam splitters 50, 52 may be mechanically adjustable, thus assisting with being able to recombine the split red laser light beam with great precision.

The numerical values mentioned below may be considered as examples of numerical values for laser module 100 according to the present invention:

If, for example, two pixels are separated by an angle of 0.05 degree, which is relevant for a scanner projector 200 having a lateral optical field of 42.5 degrees and a lateral resolution of 850 pixels, one-fifth of a pixel tolerance between the two red beams on projection surface P means that the beam combining device in the form of laser module 100 should have a tolerance of approximately 0.01 degree.

These tolerances may be decreased when the projection distance is reduced or when the number of pixels to be displayed for each projection surface is reduced, as is the case, for example, for head-up display systems.

These types of applications may be meaningful for the present invention, since the reduction of the speckle effect is an important issue for laser scanners.

FIG. 4 shows a schematic flow chart of one specific embodiment of the method according to the present invention.

A laser beam of a first laser light source 10 having a first polarization is coupled into overall laser beam 60 in a first step 201.

A laser beam of a third laser light source 30 having a second polarization is coupled into overall laser beam 60 in a second step 202.

A laser beam of second laser light source 20 having a first polarization is split into a main path and a splitting path in a third step 203, in the splitting path the polarization of the laser beam of second laser light source 20 being changed from the first polarization to the second polarization.

The laser beam of second laser light source 20 is coupled into overall laser beam 60 via the main path and via the splitting path in a fourth step 204.

In summary, the present invention provides a device and a method which allow an effective reduction of the speckle effect. It is also conceivable that the explained association of the laser light sources with the colors red, green, and blue is merely an example, and therefore may also be varied. In particular, it is also conceivable, for example, that the first laser light source is green laser light and the third laser light source is blue laser light. However, the use of the speckle effect reduction according to the present invention on red laser light is particularly effective and thus shows particularly positive results.

Compared to a conventional implementation of a speckle effect reduction using two laser modules and a total of four laser light sources, the advantage results that according to the present invention, only one laser light source is necessary for each laser beam, it being possible to precisely orient the laser beam of each laser light source with the aid of a mechanical adjustment arrangement having a simple design. Thus, compared to the conventional speckle reduction device, a laser diode together with a necessary control device may thus advantageously be dispensed with.

Although the present invention has been described with reference to preferred exemplary embodiments, it is not limited thereto.

Those skilled in the art will thus suitably modify the described features of the present invention or combine the features with one another, without departing from the core of the present invention.

What is claimed is:

1. A laser module, comprising:
a first laser light source;
a second laser light source; and
a third laser light source, wherein:
laser beams of the first, second, and third laser light sources are combinable to form an overall laser beam,
the laser beam of the first laser light source and the laser beam of the second laser light source have a first polarization, and
the laser beam of the third laser light source has a second polarization,
the laser beams of the first and the third laser light sources are coupled into the overall laser beam with the aid of mirror devices,
the laser beam of the second laser light source is split,
the first polarization of the laser beam of the second laser light source is changed from the first polarization to the second polarization in a splitting path,
the laser beam of the second laser light source having the second polarization is coupled into the overall laser beam via the splitting path, and
the laser beam of the second laser light source having the first polarization is coupled into the overall laser beam via a main path.

2. The laser module as recited in claim 1, wherein:
the laser beam of the first laser light source is reflected by essentially 90 degrees with the aid of a 50/50 beam splitter which has a surface, facing the first laser light source, having a wavelength-dependent coating which is totally reflective for the first laser light source,
the reflected laser beam of the first laser light source is coupled into the overall laser beam,
the laser beam of the second laser light source is split into the main path and the splitting path with the aid of the 50/50 beam splitter.

3. The laser module as recited in claim 1, wherein:
the change in the polarization of the second laser beam of the second laser light source is carried out using a lambda/2 plate,
an orientation of the lambda/2 plate relative to a polarization direction of the laser beam of the second laser light source is approximately 45 degrees.

4. The laser module as recited in claim 1, wherein:
the laser beam of the first laser light source is deflected by essentially 90 degrees with the aid of a wavelength-dependent coating of a first polarization-dependent beam splitter and is coupled into the overall laser beam,
the polarization of the laser beam of the second laser light source is changed from the first to the second polarization with the aid of the first polarization-dependent beam splitter,
the laser beam of the second laser light source is split into the main path and the splitting path,
a portion of the laser beam having the first polarization of the second laser light source is coupled into the main path, and
a portion of the laser beam having the second polarization of the second laser light source is coupled into the splitting path.

5. The laser module as recited in claim 4, wherein the laser beam of the second laser light source has a first polarization having an orientation of essentially 45 degrees with respect to the first polarization-dependent beam splitter.

6. The laser module as recited in claim 1, wherein:
the laser beam of the third laser light source is coupled into the splitting path of the laser beam of the second laser light source with the aid of a second mirror device which has a surface, facing the third laser light source, having a coating which is transparent to the laser beam of the third laser light source, and
the laser beam of the second laser light source having the second polarization is reflected by essentially 90 degrees with the aid of the second mirror device.

7. The laser module as recited in claim 6, wherein two mirror devices are situated in the splitting path, at least one of the mirror devices being mechanically adjustable.

8. The laser module as recited in claim 1, wherein tolerances of at least one element from a group including a 50/50 beam splitter, a first polarization-dependent beam splitter, a first mirror device, a lambda/2 plate, a second mirror device, and a second polarization-dependent beam splitter, are dimensioned in such a way that an angle between the combined laser beams of the three laser light sources is minimal.

9. The laser module as recited in claim 1, wherein the first laser light source is a blue laser diode, the second laser light source is a red laser diode, and the third laser light source is a green laser diode.

10. The laser module as recited in claim 1, wherein the first polarization is a linear polarization and the second polarization is a vertical polarization.

11. A scanner projector, comprising:
a laser module, comprising:
a first laser light source;
a second laser light source; and
a third laser light source, wherein:
laser beams of the first, second, and third laser light sources are combinable to form an overall laser beam,
the laser beam of the first laser light source and the laser beam of the second laser light source have a first polarization, and
the laser beam of the third laser light source has a second polarization,
the laser beams of the first and the third laser light sources are coupled into the overall laser beam with the aid of mirror devices,
the laser beam of the second laser light source is split,
the first polarization of the laser beam of the second laser light source is changed from the first polarization to the second polarization in a splitting path,
the laser beam of the second laser light source having the second polarization is coupled into the overall laser beam via the splitting path, and
the laser beam of the second laser light source having the first polarization is coupled into the overall laser beam via a main path.

12. A method for generating an overall laser beam from multiple laser beams, comprising:
emitting a laser beam in each case from a different laser light source;
coupling a laser beam of a first laser light source having a first polarization into the overall laser beam;
coupling a laser beam of a third laser light source having a second polarization into the overall laser beam;
splitting a laser beam of the second laser light source having the first polarization into a main path and a splitting path, in the splitting path the first polarization of the laser beam of the second laser light source being changed from the first polarization to the second polarization; and coupling the laser beam of the second laser light source into the overall laser beam via the main path and via the splitting path.

\* \* \* \* \*